United States Patent [19]

Clowes et al.

[11] Patent Number: 4,969,348
[45] Date of Patent: Nov. 13, 1990

[54] FEED SYSTEM FOR A REDRAW PRESS

[75] Inventors: Ernest J. Clowes, Lower Burrell; John J. Kester, Plum Borough, both of Pa.

[73] Assignee: Aluminum Company of America, Pittsburgh, Pa.

[21] Appl. No.: 431,815

[22] Filed: Nov. 6, 1989

[51] Int. Cl.$^5$ .................................. B21D 22/00; 43/04
[52] U.S. Cl. ...................................... 72/361; 72/421; 72/425; 198/625; 198/676; 198/663; 198/657
[58] Field of Search .................... 72/361, 421, 425; 413/3, 45, 52, 70; 198/657, 661, 663, 666, 669, 670, 676, 625

[56] References Cited

U.S. PATENT DOCUMENTS

| | | | |
|---|---|---|---|
| 931,434 | 8/1909 | Krummel et al. | 198/661 |
| 1,906,101 | 4/1933 | Rickey et al. | |
| 2,109,148 | 2/1938 | Gwinn | 198/25 |
| 2,387,638 | 10/1945 | Birdsall | 209/90 |
| 2,692,671 | 10/1954 | Day et al. | 198/676 |
| 2,966,252 | 12/1960 | Meyer | 198/666 |
| 3,026,991 | 3/1962 | Kinsley | 198/34 |
| 3,054,496 | 9/1962 | Carter | 198/625 |
| 3,244,270 | 4/1966 | Wohlnick | 198/213 |
| 3,491,574 | 1/1970 | Helrigel et al. | 72/421 |
| 3,635,069 | 1/1972 | Eickenhorst | 72/349 |
| 3,650,374 | 3/1972 | Mansfield | 198/104 |
| 3,652,369 | 3/1972 | Della Vite | 156/566 |
| 3,693,567 | 9/1972 | Dalman | 413/45 |
| 3,702,128 | 11/1972 | Trotter, Jr. | 198/64 |
| 3,717,184 | 2/1973 | Bischof et al. | 198/657 |
| 3,791,508 | 2/1974 | Osborne et al. | 198/625 |
| 3,810,381 | 5/1974 | Roth | 72/421 |
| 3,841,946 | 10/1974 | Carter | 198/625 |
| 3,866,753 | 2/1975 | Milton | 209/73 |
| 4,068,450 | 1/1978 | Easter | 198/676 |
| 4,416,133 | 11/1983 | Doyle | 72/58 |
| 4,534,202 | 8/1985 | Snyder | 72/349 |
| 4,637,243 | 1/1987 | Bond | 72/421 |

Primary Examiner—Robert L. Spruill
Attorney, Agent, or Firm—William J. O'Rourke, Jr.; David W. Brownlee

[57] ABSTRACT

This invention provides a feed system comprising a base on which a portion of the article being fed rests. The base extends along a feed path for the article. The feed system also includes at least one rotatable feed screw lying in an axis parallel to the feed path. The feed screw includes an entry end, a discharge end and a continuous, helical groove having a profile for receiving a portion of the article being fed. The feed system includes a linkage device for transferring reciprocating motion of a reciprocating press into which the articles are fed into rotary motion of the feed screw, and a feeding device for feeding articles into the groove at the entry end. The feed system also comprises a cooperating second screw or a resilient guide bar, for maintaining the article within and along the feed path as the feed screw is rotated.

13 Claims, 4 Drawing Sheets

FEED SYSTEM FOR A REDRAW PRESS

BACKGROUND OF THE INVENTION

The present invention relates to an apparatus for feeding articles, preferably generally cylindrical articles. More particularly, this invention pertains to a method and an apparatus for feeding can bodies into a drawing press in which the action of the feeding mechanism is synchronized with the reciprocating action of the press.

The prior art teaches various methods and mechanisms for feeding cups into a redraw press. Common feeding devices include air transfer systems, walking beams and oscillating fingers. These devices act to advance a plurality of partially drawn cup shaped articles, sometimes called progression cups, from one drawing operation to another in a sequential can manufacturing system.

In order to feed progression cups into conversion dies or tooling in an integrated can manufacturing system, there are a number of limiting factors that must be addressed. A primary factor is that there is a limited time window in the redraw press cycle in which an incoming cup may be deposited within the open tooling. Unless the cup is precisely deposited, with regard to both time and position, damage will result to the cans and perhaps to the equipment.

Additionally, the contemporary can designs include cans which are not easily handled because of their lightweight, thin walls and oval configuration. Air transfer systems may not maintain the cup being transferred in its original condition, such as its round condition, within a die pocket destination. Also, air transfer systems do not guarantee positive control of cup transfer. Cam actuated transfer systems sometimes mar the exterior surface of a can being transferred.

The cup transfer system of this invention includes the use of a feed screw. Feed screws have been disclosed in the prior art to convey or control movement of articles, such as bottles, U.S. Pat. Nos. 3,026,991, 3,652,369, and 3,866,753; cartridge shells, U.S. Pat. No. 2,387,638; pipes, U.S. Pat. No. 3,244,270; and container bodies, U.S. Pat. Nos. 3,635,069 and 3,650,374.

Despite progress in the area of feeding mechanisms, including the use of feed screws, there is still a need and a demand for positive feeding mechanisms such as those used to feed generally cylindrical cup shaped articles.

Accordingly, a new and improved apparatus for feeding progression cups into a drawing press is desired which links the feed system to the reciprocating action of the press and results in positive cup placement inside a tool pocket within the limited time window available.

SUMMARY OF THE INVENTION

This invention may be summarized as providing a feed system comprising a base on which a portion of the article being fed rests. The base extends along a feed path for the article. The feed system also includes at least one rotatable feed screw lying in an axis parallel to the feed path. The feed screw includes an entry end, a discharge end and a continuous, helical groove having a profile for receiving a portion of the article being fed, means for rotating the feed screw and means for feeding articles into the groove at the entry end. The feed system also comprises means, such as a cooperating second screw or a resilient guide bar, for maintaining the article within and along the feed path as the feed screw is rotated.

Among the advantages of this invention is the provision of an apparatus for positively feeding articles into the die pocket of a press.

Another advantage of this invention is the provision of an apparatus for feeding progression cups into a redraw press with at least one feed screw which rotates and thereby feeds the cups through a synchronized mechanical linkage with the reciprocating action of the redraw press.

A further advantage of the present invention is to provide a positive feeding device which precisely and repetitively delivers a cup shaped article within a narrow time window available for delivery.

An objective of this invention is to provide a cup feed system which transfers lightweight, thin walled cups within a positive feed system without damage to the cups and while retaining the general cylindrical configuration.

A feature of this invention is the use of at least one feed screw with a continuous groove to accept a cup to be transferred, and convey the cup along the groove in response to rotation of the feed screw.

Another feature of the cup feed apparatus of this invention is that cups are maintained in their cross-sectional configuration, typically a round condition, throughout the transfer cycle.

Another feature of the present invention is that the groove in the feed screw is provided with a profile which causes the cup being transferred to be accelerated at least through the final stages of transfer to assure positive cup placement within a narrow time window.

A further advantage of the feed system of the present invention is that the feed screws operate within a confined space which permits retrofit of existing cup transfer systems within existing configurations and space limitations.

These and other objectives and advantages of the invention will be more thoroughly understood and appreciated with reference to the following description and the accompanying drawings.

DESCRIPTION OF THE PREFERRED EMBODIMENTS

Although the detailed description focuses upon the present invention as applied to a feed system for delivering 300×407 aluminum food cans into a redraw press, it should be understood that the present invention may be utilized to feed a variety of articles. Where the words "upper", "lower" and the like are used in this application, the meaning, unless specifically indicated to the contrary, is to be applied with reference to a cup or can standing on its base in an upright position.

Figure 1:
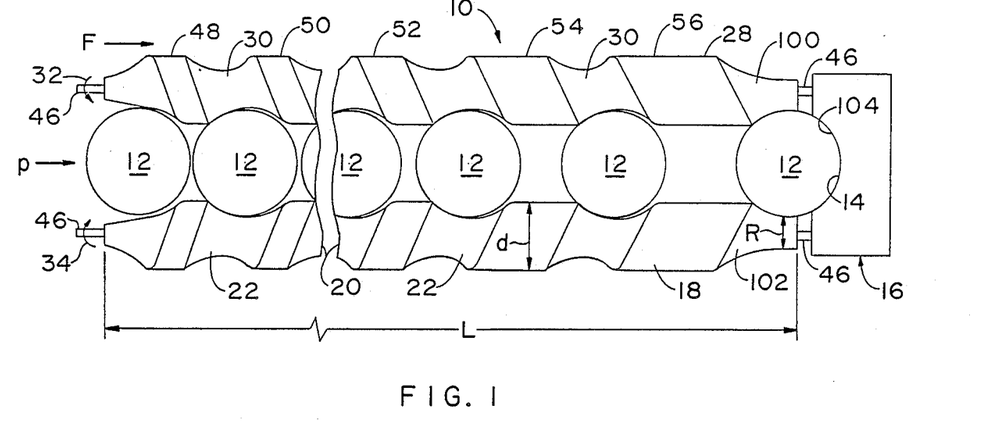
FIG. 1 is a top elevation view of a feed system of the present invention.

Referring particularly to the drawings, FIG. 1 illustrates a preferred feed system 10 of the present invention. The feed system is used for positive delivery of articles, such as the partially formed, cup shaped, thin walled progression cups 12 shown in the drawing. It will be appreciated by those skilled in the art that the feed system of this invention may be applied to feed a variety of shapes and sizes of articles, though particularly useful in conveying rigid packages, such as progression cups. Such progression cups are preferably aluminum alloy, such as, but not limited to, 3004 aluminum alloy, typically used in the food and beverage industry, initially drawn to a diameter of 4.950 inch and a height of 2.000 inch, intended for redraw to a final configuration of a 300×407 can body.

In a preferred embodiment of this invention, progression cups are delivered to and seated in a pocket 14 of a die 16. The feed system accommodates various attendant conditions. The cups being conveyed are typically thin walled metallic cylinders which are conveyed at high speed without causing deformation or damage to the sidewalls. The speed at which progression cups are currently delivered to a die pocket 14 in a redraw press in accordance with prior feeding mechanisms is typically 75 to 80 cups per minute. By the present invention, feed speeds in excess of 300 cups per minute are attainable. It will be appreciated that not all equipment is capable of accepting articles at such high speeds; therefore the feed system must be capable of accommodating the capabilities of the accepting equipment. Considering the preferred embodiment of seating progression cups in a die pocket of a redraw press, it will be appreciated that the elapsed time period in which redraw tools provide sufficient clearance to accept an incoming cup is extremely short. As will be explained in detail below, a preferred feed system of this invention provides a means for accelerating cup feed speed during the brief time window available to seat the cup. Also, unless the cup is accurately positioned and centered within a die pocket, the reciprocating redraw press tools could crush the cup therein and disrupt the redraw application. As will be explained below, the feed system of the present invention accommodates such conditions.

Figure 2:
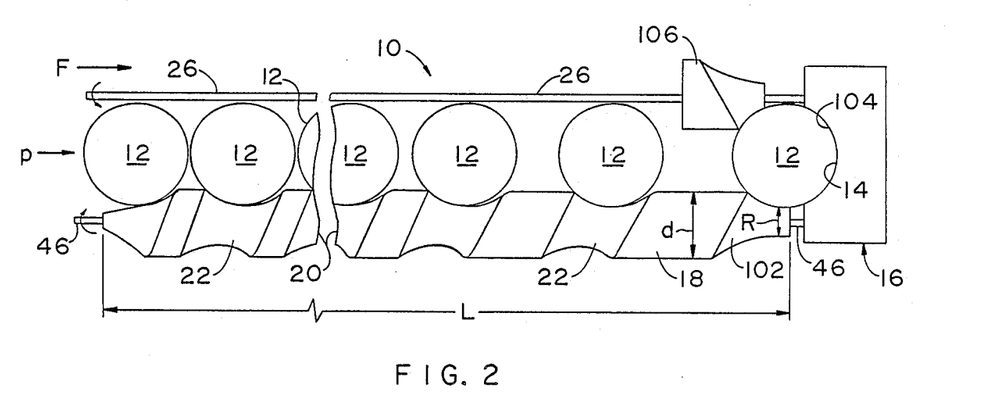
FIG. 2 is a top elevation view of an alternative feed system of the present invention.

The feed system 10, as shown in FIGS. 1 and 2, includes at least one feed screw 18. The feed system is illustrated with broken lines 20 to indicate that the length L of the screw may vary. The screw, which may be a unitary structure or may comprise a plurality of longitudinally aligned segments, may be made of any number of materials. However, due to the importance of drive requirements it is preferred that the screw, or at least the portion of the screw near the die pocket 14, be made of a lightweight, wear resistant material with a smooth exterior surface. Exemplary lightweight, smooth screw materials include nylon such as Nylatron material, UHMW (ultra high molecualr weight plastic) or other plastic materials.

The feed screw 18 has a continuous helical groove 22 provided in the outside surface thereof. The depth of the groove 22, as measured from the outside diameter d to the root diameter R, and the width of the groove 22 must be sufficient to accommodate the article being conveyed, such that when the article is within the helical groove 22 and the feed screw 18 is rotated, the article is maintained in the groove as the article is conveyed in the feed direction F.

A preferred continuous groove 22 which is illustrated in the drawing is shown to have a contour which generally mirrors the contour of the cup 12 being conveyed. It should be appreciated that various alternative profiles, contours, styles and configurations may be selected for the feed screw 18 of the present invention. Such alternative contours include triangular, rectangular, arcuate and the like. What is necessary is that the article being conveyed adequately seats within the groove of a feed screw, such that rotation of the screw within the feed system causes the article to be conveyed. Those skilled in the art will appreciate that the feed screws described and shown in this application are preferred embodiments, and that there are numerous embodiments encompassed within the scope of this invention.

It has been found that a feed screw 18 having an outside diameter d of 3.5 inches and a root diameter R of 2.0 inches is adequate to convey progression cups 12 having a diameter of 4.950 inches and a height of 2.000 inches into the die pocket of a first redraw press. A feed screw 18 having an outside diameter d of 4.25 inches and a root diameter R of 3.25 inches has been found adequate to convey larger progression cups 12, such as 3.70 inch diameter by 3.70 inch height cups, into the die pocket of a second redraw press. It will be appreciated that the sidewalls of such cups are typically thin, on the order of less than about 0.010 inch. Therefore, it may be desirable to align the longitudinal axis of the feed screw 18 more toward the closed base 24 of the cup 12 where there is more structural support as compared to the open top portion of the cup 12, as best shown in FIG. 3.

The feeding system 10, as shown in FIG. 2, further includes a side guide rail 26 which maintains the cups 12 in the helical groove 22 as the cups are fed toward the die pocket 14. The side guide rail 26 may be a stationary bar, preferably having a smooth outside finish along which the cups may slide with minimal frictional resistance during the cup feeding operation. In an alternative embodiment the side guide rail 26 may be urged, such as with a spring or other biasing device, toward the opposing feed screw 18 to further insure that the cups are maintained in the groove 22. Preferably, the side guide rail 26 and the opposing feed screw 18 lie in longitudinal axes which are parallel to one another and are disposed to contact the respective cups at transverse contact points which are at or near the same height above the base of the cup 24.

In a preferred feed system 10 illustrated in FIG. 1, a second opposed feed screw 28 is utilized. A second feed screw 28 serves not only to maintain the cups in the helical groove 22 as is the function of the side guide rail 26 discussed above, but also to assist in the conveyance of the cups 12. In the system shown in FIG. 1, conveyance assistance is obtained by providing a substantially continuous helical groove 30 in the second feed screw 28 similar in shape but opposite in direction to that provided in the opposed feed screw 18, and rotating the second feed screw in a direction 32 opposite the direction 34 of rotation of the first feed screw 18. When two opposed feed screws are utilized, it is not necessry that the size, length or diameter of the two screws be the same. It is desirable that the contour of the grooves in the two screws accommodate the circumferential shape of the cups being conveyed. It will be appreciated that where two opposed, cooperating screws are utilized, the screws may rotate in the same direction or in opposite directions as a matter of design choice, dependant primarily on whether the same or different drive mechanisms are utilized to rotate the cooperating screws. Of course, the direction of the helical groove must accommodate and complement the screw rotation direction.

Figure 3:
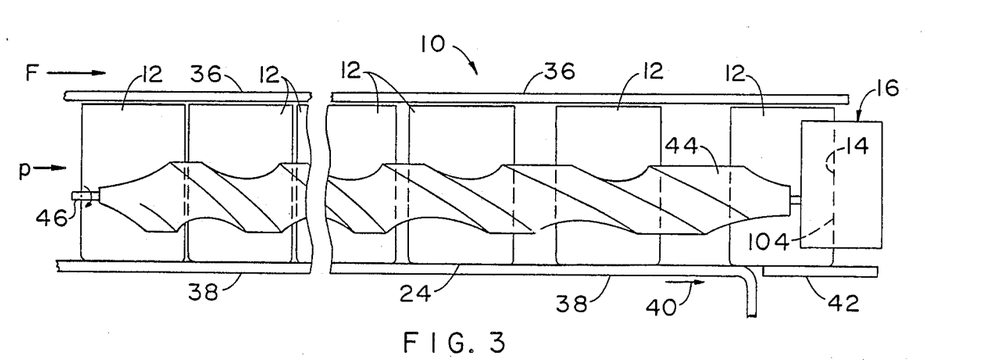
FIG. 3 is a side elevation view of a feed system of the present invention.

As shown in FIG. 3, the feed system 10 may include a top guide rail 36 disposed above the top edge of the cups 12, and preferably substantially centered along the cup conveying path. The top guide 36 may be a single, stationary bar, rod or tube, or a series of bars, rods or tubes preferably having a smooth outside finish along which a top edge of the cups 12 may slide with minimal frictional resistance. It will be appreciated by those skilled in the art that the forces directed against the cup 12 being conveyed by the feed screw are not entirely directed in the horizontal feed direction. At least a portion of such forces are directed in a non-lateral direction. The top guide rail 36 has been found adequate to resist such non-lateral upward force with minimal, if any, adverse effects on the lateral cup feed operation and to enhance the beneficial effect of the horizontal forces driving the cups. Likewise, the base portion 38, discussed below, resists such non-lateral downward force with minimal, if any, adverse effects.

The feed system 10 as shown in side elevation in FIG. 3 also includes a base portion 38. The base portion 38 may be any structure upon which the base 24 of the cup 12 may be supported as the cups 12 are fed by the rotating feed screw or screws. In one embodiment the base portion 38 may be a metal or plastic floor, made of solid or semisolid material. Alternatively, the base may consist of a series of bars, rods, channels, or the like. In a preferred embodiment the base portion 38 is a substantially flat, fabric conveyor belt which moves at substantially the same rate and in the same direction, see arrow 40, as the cup feed direction F. Toward the discharge end of the conveyor 38 the base of the feed system may convert to or extend into a stationary floor 42 which extends into the floor of the die pocket 14 of a redraw press.

As further shown in the drawings, each feed screw 18, 28 and 44 may rotate about a central axle 46. The central axle 46 may be a metal rod, bar or tube about which the feed screw rotates. In a preferred embodiment the axle 46 comprises a metal tube which is inserted into a feed screw, both of which are then pinned together to assure the connection. Such pins may also provide means for timing the screw rotation as discussed below. Preferably, the axle lies in the longitudinal axis of the feed screw.

Each feed screw 18, 28 and 44 of the present invention rotates in the appropriate direction to feed progression cups 12 toward the die pocket 14. In FIG. 1, for example, the first feed screw 18 is rotated in a couterclockwise direction, see arrow 34, while the second feed screw is rotated in a clockwise direction, see arrow 32, when the screws are viewed in the feed direction F. The design aspects of such screws and the potential to rotate cooperating screws in the same or opposite directions is discussed above.

The rotary drive of the feed screw is directly linked, and thereby synchronized with the reciprocating motion of the tools of the redraw press. By linking the press tool action with the rotation of the feed screw, positive transfer of the porgression cups is achieved. In fact, the linking of the tools to the feed screws insures that variations in the reciprocating speed of the tools do not cause any feeding difficulties. By providing a cup feeding system which is dependent on or linked to the tool action, problems otherwise associated with the variablility of two unrelated systems are avoided. Those skilled in the art will appreciate the value of linking the feed system to the tool action, especially in view of the high speed operation and the minimum time available in a press cycle to accurately transfer and place a cup 12 within a die pocket 14.

The reciprocating motion of the tools of the redraw press may be transferred into synchronized rotation of the feed screw by a variety of techniques. In a preferred embodiment each cycle of the press will result in a finite number of feed screw rotations to permit precise control to the feed system.

Figure 4:
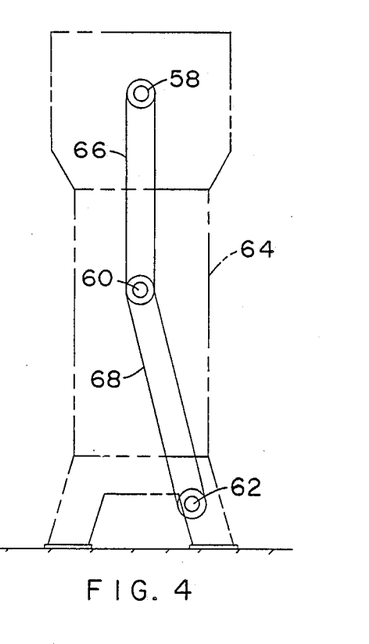
FIGS. 4 and 5 illustrate schematically a preferred apparatus for linking the motion of a press with the rotation of one or more feed screws in a feed system of the present invention.
Figure 5:
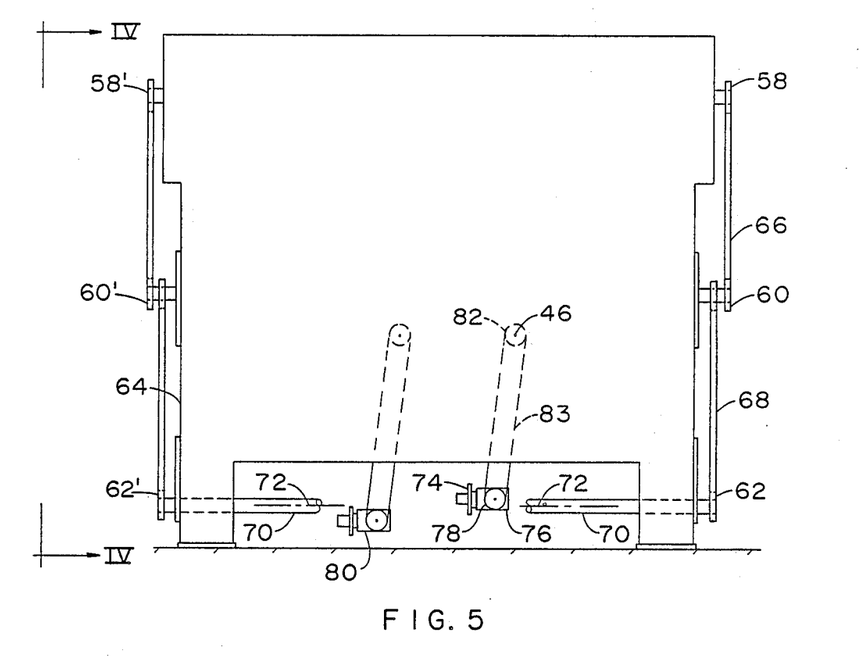

One exemplary scheme for transferring the reciprocating motion of the redraw press tools to rotary motion of the feed screw is shown schematically in FIGS. 4 and 5. FIG. 4 is a side elevation view of the assemblies 58, 60 and 62 on one side of a redraw press shown in phantom lines 64 in FIG. 4. These assemblies may be sprocket assemblies used to drive chains, or sheave assemblies used to drive belts, preferably timing belts. Timing belts preferably have teeth to engage corresponding surfaces in the sheaves to insure positive displacement, and withstand severe operating conditions and environments. Depending on the linkage system used, take-ups may have to be provided. FIG. 5 is a front elevation view illustrating a preferred embodiment for positively linking the redraw press tool motion to that of the feed screws. As shown in FIGS. 4 and 5, an upper sheave assembly 58 is provided which rotates in response to the reciprocating action of the tools in a redraw press. The rotation of the upper sheave 58 is transferred through an intermediate sheave assembly 60 to a lower sheave assembly 62 through appropriate connections such as timing belts 66 and 68, respectively. Of course, sprocket assemblies may be used in conjunction with drive chains. A corresponding linkage may also be provided on the opposite end of the redraw press through sheaves 58', 60' and 62'.

Rotation of the lower sheaves 62 and 62' drives the lower shaft 70. The shaft 70 having a center line 72 is mechanically interconnected with the drive wheel or sheave 74 of at least one drive unit 76 having a sheave 78. In common redraw presses, there may be eight tool sets on each side of the press, requiring sixteen feeding paths for progression cups, eight on each side of the machine. FIG. 5 shows two drive units 76 and 80 for the purposes of illustration; however, it will be appreciated that typically there would be eight such drive units being driven by the lower shaft 70, driving at least eight feed screws, or eight pairs of feed screws, on one or both sides of the machine, as is explained below.

The drive sheave 78 may be connected to a feed screw sheave 82 such as with a timing belt 83 or a drive chain. The feed screw is rotated directly by the feed screw sheave 82. In a preferred embodiment the axle, such as axle 46 of the feed screw 18, is centered in and driven by the feed screw sheave 82. In a preferred embodiment, where a cooperating second screw is provided, the feed screw sheave 82 may drive both cooperating screws, or an additional linkage may be provided to drive the second screw, or to actuate an oscillating finger 106 shown in FIG. 2, independent of the guide rail 26.

The above described positive linkage system is preferred at least in part because of the space limitations in the redraw operation. The space available in current redraw operations is extremely restricted, yet the feed system of this invention including the above described positive linkage system fits compactly into existing facilities such that retrofit of existing machinery as well as new installations may readily incorporate the feed system of this invention, with minor modification.

Alternative methods and mechanisms may be employed to transfer the reciprocating motion of the tools in the press to feed screw rotation in an intergrated press system. The mechanism described above integrates that portion of a press cycle when the tools are clear of the die pocket, with the delivery of a cup into the die pocket by a feed screw as described herein. The intergration may be at a ratio of 1:1, 2:1, 3:1, 5:1, etc. depending upon such variables as cup size, feed screw profile, feed screw length and rotation rate, and the like. If the integration is not accomplished, incoming cups would strike the obstructing tools of the press and be crushed rather than be formed.

It will be appreciated that integration of the cup feed with the press operation permits the operation to flow efficiently and effectively regardless of fluctuations or interruptions in the press operation. If the press speed is increased or decreased, significantly or insignificantly, the feed rate of the progression cups responds directly to such press speed fluctuations assuring that the cups are fed into the press at an integrated, appropriate time. The direct linkage between the feed system and reciprocating tools may incorporate stepping motions, slip clutches or the like to accommodate planned interruptions or discontinuities in the system. This means that the articles being fed do not always have to be in motion in response to the action of the press tools, and that planned or intentional stopping or idling points may be incorporated into a direct linkage system.

Since the tools of the redraw press utilizing a feed system of the present invention reciprocate at a substantially constant rate, of about 80 to 120 cups per minute, or 1.3 to 2.0 cups per second, the interconnected feed screw rotates at a corresponding, substantially constant rate. Considering that it takes about 0.50 to 0.77 seconds for the redraw press tools to complete one cycle, there is only a fraction of that time, on the order of about 0.10 to about 0.15 second, that the tools are open to a sufficient degree to accept a cup 12. With such a brief time window, it is preferable to accelerate the cup 12 feed speed as the cup 12 approaches the die pocket 14 to assure positive cup placement within the minimun time available to accomplish this task. Since the feed screw rotates at a substantially constant speed, cup acceleration may be accomplished by extending the transverse length along the feed screw between successive helical groove rotations as the groove approaches the discharge end of the feed screw. Thus, it is preferred that the pitch of the helical groove is greater at the discharge end as compared to those portions immediately ahead of the discharge end so as to accelerate the movement of the articles at the discharge end of the feed screw.

As illustrated in FIG. 1, the second feed screw 28 is provided with a substantially continuous helical groove 30 along the length thereof. The profile of the groove 30 is substantially constant; however, in a preferred embodiment the pitch, i.e., the length of advance in a single turn, increases progressively toward the discharge end of the feed screw 28. As seen in FIG. 1, the pitch may be constant at the entry end of the feed screw, such that the ungrooved surface portions 48 and 50 have approximately the same length. However, it is preferred that the pitch of the feed screw increase at the discharge end of the feed screw 28 such that the ungrooved surface portions 52, 54 and 56, respectively, have a progressively increasing length at the discharge end of the feed screw. Such preferred structure causes the cup 12 being fed in the grooves 22 and 30 of the feed screws 18 and 28 to move at an accelerated rate through a zone of increasing pitch at the discharge end of the feed system 10 in response to a constant rotary motion of the feed screws 18 and 28.

Figure 6:
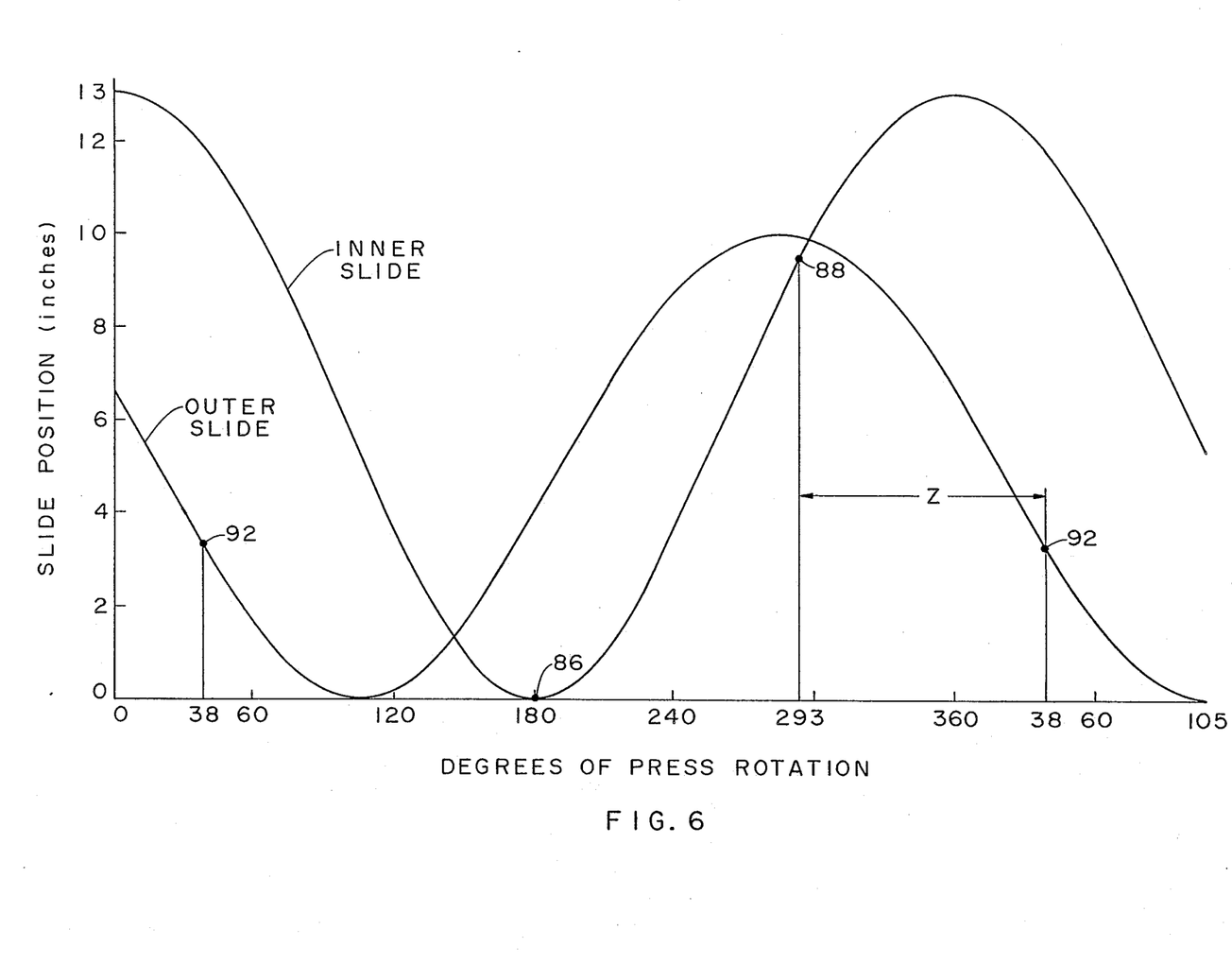
FIG. 6 is an exemplary timing diagram illustrating the position of an inner slide and an outer slide of a redraw press at various degrees of press rotation.

FIG. 6 shows progressive positions of the rams of an exemplary press tool including an exemplary inner slide with a 13 inch stroke and an exemplary outer slide with a 10 inch stroke of a preferred redraw press, as the press proceeds through and beyond 360° of rotation and proceeds into a second rotation. Although such stroke lengths are mentioned, this invention is not limited to such embodiments. At the beginning of a press cycle, i.e., at 0° of press rotation, the inner slide is at its maximum slide position of 13 inches, i.e., the ram of the inner slide is in the full "up" position. The outer slide is at about a 6.7 inch position and progressing in a downward cycle.

An example of a timing diagram for a first redraw operation is illustrated in FIG. 6. With respect to the inner slide, at point 86 the ram starts to rise, such that at point 88 the punch on the end of the ram on the inner slide is at a location 0.25 inch above the height of a progression cup. This point 88 corresponds with 293° of press rotation. At point 92 on the graph in FIG. 6, the pressure sleeve of the outer slide is at a location 0.25 inch above the height of the progression cup. This point 92 corresponds with 38° of press rotation as the press proceeds into a second rotation, shown in FIG. 6. Therefore, the time window during which a progression cup may be deposited within the die pocket of a redraw press corresponds with zone z which represents from 293° of one rotation to 38° of the next, succeeding press rotation. In a preferred second redraw operation the available time window has been found to correspond with a narrower time window or zone which represents from 315° of a first rotation to 18° of the next, succeeding press rotation.

For the purposes of determining the available time window a clearance of 0.25 inch was set as a minimum clearance. It will be appreciated that less or more clearance may be established in the operating parameters of such system depending primarily on the reliability and capability of the feed system employed. Also, the time window and timing diagram are different for progression cups of different height or for single action presses.

Figure 7:
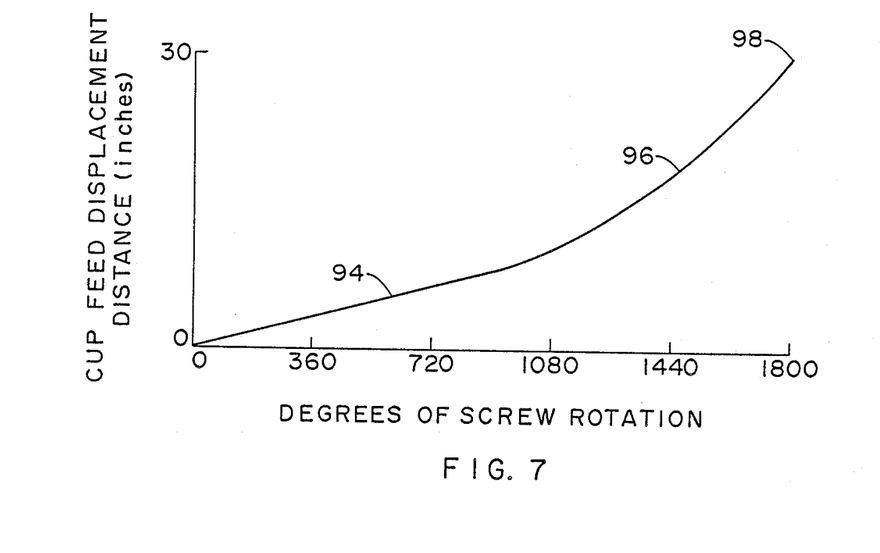
FIG. 7 is a graph illustrating can feed displacement distance in a feed system of the present invention at various degrees of feed screw rotation.

FIG. 7 illustrates cup displacement distance, from entry to discharge of the feed system with relation to the rotation of the feed screw. A cup 12 is fed into and through an entry portion of the screw feed system 10 at a substantially constant velocity as shown along segment 94. Then, due to the increased pitch of the groove in the feed screw, and the substantially constant rotation rate of the feed screw, the cup feed speed accelerates along segment 96. At the end of the acceleration segment, at point 98, the cup is deposited into the die pocket of a redraw press. It will be understood that the cup sits within the die pocket for a time, called dwell time, wherein no further displacement occurs. While the cup sits in the die pocket, the feed screw continues to rotate, such rotation urging the deposited cup in place in a manner which maintains the typically round configuration of the cup, while continuing to advance successive cups. Note in FIG. 7 that it takes five complete revolutions of the feed screw or 1800° of revolution to advance the cup from entry to discharge. Five revolutions have been found preferable to accommodate transfer of a progression cup along a 30.0 inch screw having a 3.5 inch outside diameter and a 2.0 inch root diameter, although alternative parameters may be employed.

After a cup has been redrawn within the tools of a redraw press according to a preferred embodiment as described herein, it is common that the cup is discharged vertically downwardly, through the tools of the redraw press, thereby clearing the tool path for the next, successive incoming cup.

In the operation of the feed system 10 of this invention, a supply of articles, such as progression cups, is fed to the entry end of a feed screw. The cups to be fed into the feed screw are maintained in their upright position, standing on their base, as the supply is appropriately funneled into the entry of the feed screw 18 or feed screws 18 and 28 of this invention without cup damage. By maintaining adequate pressure p against the stream of incoming cups 12, the cups 12 become seated within the groove 22 or grooves 22 and 30 of the feed system as the feed screws are rotated. The feed mechanism may be adapted to feed a cup into each recess formed with each rotation of the feed screws, or appropriate measures may be provided to feed a cup into every other recess, or every third recess, or the like, depending on how the feed screws are integrated with the tools of the redraw press. The articles are conveyed with the base 24 of the cup 12 seated on a traveling conveyor 38. At the exit or discharge end of the feed screw 18 or screws 18 and 28, the feed rate is preferably accelerated such that the cup 12 is quickly moved, transferred or displaced through a zone of increasing pitch in the discharge portion at the exit end of the feed screw. The feed screw 18 or screws 18 and 28 are configured toward the discharge end such that end portions 100 and 102 have an external profile which upon rotation holds a cup 12 against the mating wall 104 of the die pocket 14 within close tolerance, preferably within ±0.010 inch. An oscillating finger 106 may be provided opposite the exit end of the feed screw 18 to linearly translate toward and away from the cup 12 without interfering with the feed and to assist feed screw 18 portion 102 in the urging of a cup 12 within the die pocket 14, and to assure that the cup 12 retains its typically round configuration. It will be appreciated that the successive cups 12 continue to be conveyed along the rotating screws as one cup is held in the die pocket 14. And, since this period of time that the cup 12 is held in the die pocket 14 prior to the redraw operation is so brief, the incoming stream of cups is not adversely affected. In fact, the cup deposit operation is so critical in terms of cycle time, it is important that the traveling, successive cups continue their advance even during the period that a cup is held or dwells within the die pocket 14.

What is believed to be the best mode of the invention has been described above. It will be apparent to those skilled in the art that numerous variations of the illustrated and described details may be made without departing from the scope of this invention.

We claim:

1. An apparatus for feeding articles having generally cylindrical sidewalls into the tools of a reciprocating press comprising:
    a base on which a portion of the articles to be fed rests, said base extending along a feed path for the articles,
    at least one rotatable, elongated cylinder lying in an axis substantially parallel to the feed path, having an entry end,
    a discharge end portion axially opposite the entry end, and
    a continuously helical groove in an outside surface of the cylinder, said groove having a profile for engaging a portion of an outside surface of the generally cylindrical sidewall of the article, said groove having a zone of increasing pitch at the discharge end portion so as to accelerate movement of the articles through the zone of increasing pitch to discharge the articles from the groove at the discharge end portion into the tools of the reciprocating press,
    means for rotating the elongated cylinder, said rotating means integrally linked with reciprocating parts of the reciprocating press having tools into which the articles are fed from the discharge end portion of the cylinder when the tools of the press are in an open position,
    means for feeding articles into the groove of the cylinder, and
    means for confining the article within the groove so that rotation of the cylinder continuously moves the article along the feed path in response to reciprocating motion of the press.

2. A feeding apparatus as set forth in claim 1 wherein at least a portion of the base is a stationary plate.

3. A feeding apparatus as set forth in claim 1 wherein at least a portion of the base is a moving conveyor.

4. A feeding apparatus as set forth in claim 1 wherein the articles are substantially cylindrical.

5. A feeding apparatus as set forth in claim 4 wherein the groove has a radius of curvature equal to or greater than the radius of curvature of the substantially cylindrical article.

6. A feeding apparatus as set forth in claim 1 wherein the groove in the elongated cylinder has a pitch greater at the discharge end portion than immediately adjacent the discharge end portion so as to accelerate movement of the articles through the discharge end portion and into the tools of the press.

7. A feeding apparatus as set forth in claim 1 wherein the confining means comprises a side guide rail generally opposite the elongated cylinder.

8. A feeding apparatus as set forth in claim 7 wherein the elongated cylinder and the side guide rail are substantially parallel to one another and are disposed to contact the outside surface of the articles at transverse contact points substantially equidistant from a base of the feeding apparatus.

9. A feeding apparatus as set forth in claim 7 wherein the guide rail is biased against an outside surface of the article.

10. A feeding apparatus as set forth in claim 1 further including a top guide rail above an upper surface of the article being fed, in the feed path along the length thereof.

11. A feeding apparatus as set forth in claim 1 further including a second elongated cylinder, generally opposite the first elongated cylinder in an axis substantially parallel to the feed path, having an entry end, a discharge end portion axially opposite the entry end, and a helical groove complementary to the helical groove in the first elongated cylinder.

12. A feeding apparatus as set forth in claim 11 wherein the first elongated cylinder and the second elongated cylinder are rotated in unison.

13. An apparatus for delivery of a partially formed, thin walled, cylindrical can body into a die pocket of a can drawing press, at a rate in excess of 80 can bodies per minute with delivery synchronized with reciprocating action of tools of the press, comprising:

a floor on which a base portion of the can body rests as the can body is fed along a feed path, a first rotatable feed screw lying in an axis substantially parallel to the feed path, having an entry end, a discharge end opposite the entry end, and a continuously helical groove in an outside surface of the first feed screw, said groove having a curvilinear profile for engaging a portion of an outside cylindrical surface of the can body, said groove having a pitch greater at the discharge end portion than the pitch immediately upstream of the discharge end portion adapted to accelerate movement of the can body through the discharge end portion and into the die pocket during a 0.10 to 0.15 second time window that the reciprocating tools of the press are open a sufficient degree to accept the can body, a second rotatable feed screw generally opposite the first feed screw in an axis substantially parallel to the feed path having an entry end, a discharge end axially opposite the entry end, and a helical groove in an outside surface of the second feed screw, said groove having a curvilinear profile for engaging a portion of an outside cylindrical surface of the can body, said groove having a pitch cooperating with the pitch of the groove in the first feed screw, means for simultaneously rotating the first and second feed screws to move the can bodies, said rotating means integrally linked with reciprocating motion of the reciprocating press, means for feeding the can bodies between mating grooves of the opposed first and second feed screws at the entry ends thereof, means for confining the can bodies within the mating grooves along the feed path so that simultaneous rotation of the feed screws continuously moves the can body along the feed path at a rate in excess of 80 can bodies per minute and accelerates the movement of the can body through the discharge end portion as can bodies are deposited in the die pocket, with each can body deposit occurring when the tools of the press are in the open position, and means for retaining the can body in the die pocket until the can body is engaged by the reciprocating tools of the press. 17

* * * * *